D. H. ISEMINGER.
Sorghum Evaporating Pan.
No. 47,020.
Patented March 28, 1865.
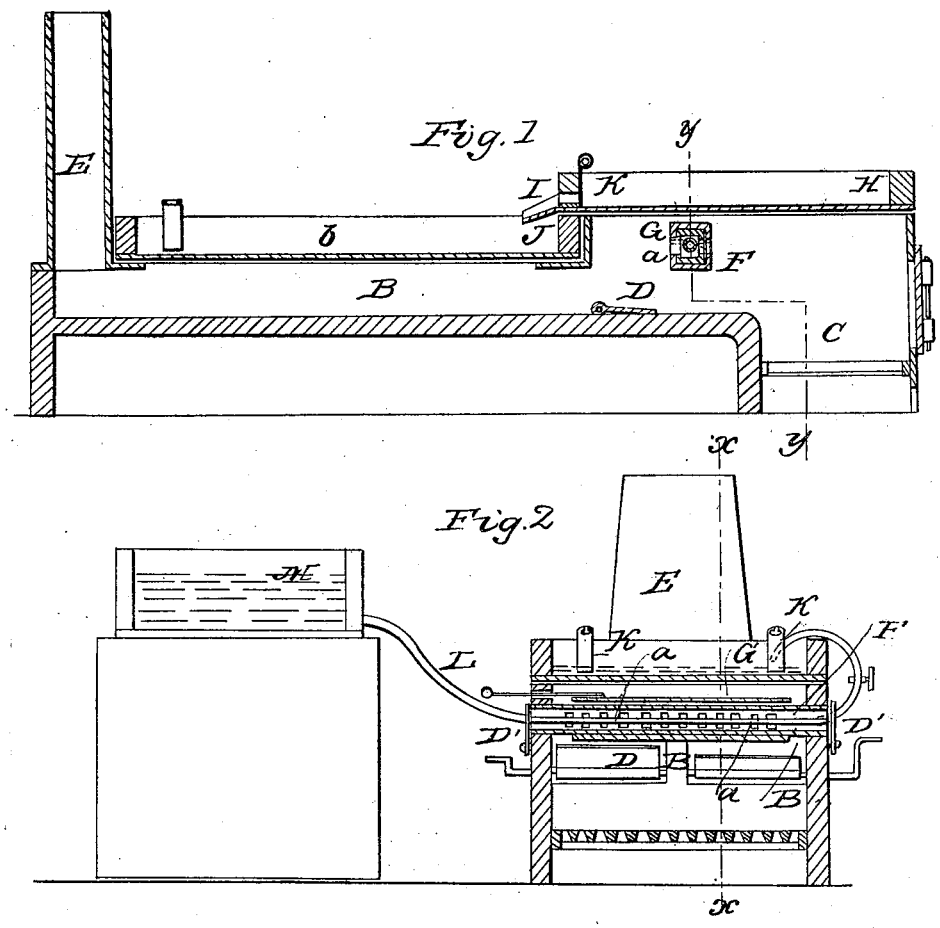

UNITED STATES PATENT OFFICE.

D. H. ISEMINGER, OF HEYWORTH, ILLINOIS.

IMPROVED SORGHUM-EVAPORATOR.

Specification forming part of Letters Patent No. 47,020, dated March 28, 1865.

*To all whom it may concern:*

Be it known that I, D. H. ISEMINGER, of Heyworth, in the county of McLean and State of Illinois, have invented a new and Improved Sorghum-Evaporator; and I do hereby declare that the following is a full, clear, and exact description thereof, which will enable others skilled in the art to make and use the same, reference being had to the accompanying drawings, forming part of this specification, in which—

Figure 1 is a longitudinal vertical section of my invention, taken in the line $x\ x$, Fig. 2; Fig. 2, a transverse vertical section of the same, taken in the line $y\ y$, Fig. 1.

Similar letters of reference indicate like parts.

This invention relates to a new and improved device for evaporating sorghum; and it consists in a means employed for heating the juice preparatory to its entering the evaporating-pan, thereby economizing time.

The invention further consists in the employment or use of two evaporating-pans, placed on the furnace and arranged relatively with each other and provided with gates, as hereinafter set forth, whereby the process of evaporating may be conducted without danger of burning the juice.

A represents a furnace, which may be constructed of masonry or metal, and provided with two horizontal flues, B B, which communicate with the upper part of the fire-chamber C, each flue at its junction with the fire-chamber being provided with a damper, D, both of which are shown in Fig. 2.

E is the smoke-stack at the rear of the flues B B.

F represents a heater, which is simply a tube passing transversely through the fire-chamber C, and perforated with holes $a$. This tube is open at both ends, and is provided with a door, D', at each end, by which air may be admitted into the heater or cut off from it, as may be desired. The heater is also provided with a slide, G, which is perforated like the tube or heater F, and forms a register.

On the top of the furnace A, directly over the fire-chamber C, there is placed an evaporating-pan, H, having two spouts, I I, at its rear end, and on the top of the furnace, over the flues B B, there is placed another evaporating-pan, J, which is divided into two compartments by a longitudinal partition, $b$. This pan J is rather lower than the pan H, so that the contents of the former may, when desired, be let into the latter through the spouts I I, said spouts being provided with gates K K.

The heater F is for the purpose of heating the juice preparatory to its advent into the pan H, and this is accomplished by means of a pipe, L, which extends from the juice-receptacle M, passes through the heater F, and is curved upward and over the top of the pan H, as shown in red in Fig. 2, the pipe L being provided with a stop-cock in order to regulate or stop the flow of the juice into H, as may be desired. This preliminary heating of the juice greatly expedites the evaporating process, for it enters the pan H in a warm state, and evaporation soon commences in H. After boiling in H a requisite length of time the juice is let into the rear pan, J, and the evaporating process there finished. By this means the juice will be prevented from burning. The heat under J may be regulated as desired by adjusting the dampers D D.

While disclaiming the general idea of passing the supply-pipe through the furnace to effect the preliminary heating of the juice,

I claim—

1. The combining of the register G with the pipe L and furnace C, all arranged substantially as and for the purposes set forth.

2. In combination with the furnace C and pan H, the longitudinally-divided pan J, divided flues B B, and dampers D D, all arranged and operating as described.

D. H. ISEMINGER.

Witnesses:
W. VAN ORDSTRAND,
JAS. H. POTTER.